US008585288B2

(12) United States Patent
Kuwabara et al.

(10) Patent No.: US 8,585,288 B2
(45) Date of Patent: Nov. 19, 2013

(54) LINEAR MOTION GUIDE UNIT

(75) Inventors: Hideki Kuwabara, Gifu (JP); Ryouichi Satake, Gifu (JP)

(73) Assignee: Nippon Thompson Co., Ltd., Tokyo (JP)

( * ) Notice: Subject to any disclaimer, the term of this patent is extended or adjusted under 35 U.S.C. 154(b) by 431 days.

(21) Appl. No.: 12/793,063

(22) Filed: Jun. 3, 2010

(65) Prior Publication Data

US 2010/0329595 A1  Dec. 30, 2010

(30) Foreign Application Priority Data

Jun. 30, 2009 (JP) ................. 2009-155662

(51) Int. Cl.
*F16C 33/72* (2006.01)
*F16C 29/06* (2006.01)
*F16C 29/08* (2006.01)
*F16C 33/78* (2006.01)

(52) U.S. Cl.
CPC ........... *F16C 29/084* (2013.01); *F16C 33/7823* (2012.01)
USPC .............................................. 384/15; 384/45

(58) Field of Classification Search
USPC .............. 384/7, 13, 15, 43–45; 277/345, 544, 277/556, 577
See application file for complete search history.

(56) References Cited

U.S. PATENT DOCUMENTS

| 3,515,444 | A | * | 6/1970 | Grabner | 384/15 |
|---|---|---|---|---|---|
| 3,970,321 | A | * | 7/1976 | Dechavanne | 277/556 |
| 4,099,798 | A | * | 7/1978 | Steinmetz | 277/345 |
| 4,254,531 | A | * | 3/1981 | Hennig et al. | 15/256.5 |
| 4,963,038 | A | * | 10/1990 | Asano et al. | 384/15 |
| 5,087,130 | A | * | 2/1992 | Tsukada | 384/15 |
| 5,230,520 | A | * | 7/1993 | Dietle et al. | 277/559 |
| 5,388,911 | A | * | 2/1995 | Agari | 384/15 |
| 5,388,912 | A | * | 2/1995 | Agari | 384/45 |
| 5,494,354 | A | * | 2/1996 | Tsukada | 384/13 |
| 5,634,722 | A | * | 6/1997 | Yuasa et al. | 384/44 |
| 5,678,829 | A | * | 10/1997 | Kalsi et al. | 277/559 |
| 5,738,358 | A | * | 4/1998 | Kalsi et al. | 277/559 |
| 5,873,576 | A | * | 2/1999 | Dietle et al. | 277/559 |
| 6,155,717 | A | * | 12/2000 | Michioka et al. | 384/15 |
| 6,401,867 | B1 | * | 6/2002 | Michioka et al. | 384/13 |
| 6,705,430 | B2 | * | 3/2004 | Michioka et al. | 184/5 |
| 2006/0214380 | A1 | * | 9/2006 | Dietle et al. | 277/559 |
| 2007/0242906 | A1 | * | 10/2007 | Kakei | 384/45 |
| 2008/0131037 | A1 | * | 6/2008 | Keller et al. | 384/15 |

(Continued)

FOREIGN PATENT DOCUMENTS

| JP | 2007211900 A | * | 8/2007 | ............. F16C 33/78 |
|---|---|---|---|---|
| JP | 2008002491 A | * | 1/2008 | ............. F16C 29/06 |
| JP | 2008281091 | | 11/2008 | |
| JP | 2009144746 A | * | 7/2009 | ............. F16C 33/76 |

(Continued)

*Primary Examiner* — Marcus Charles
(74) *Attorney, Agent, or Firm* — Cozen O'Connor

(57) ABSTRACT

The sliding mechanism including rolling elements 3 as a main element is protected against entry of foreign substances. First, second auxiliary lips 14, 15 are formed in positions on inclined faces 9b formed on lips 9 of end seals S facing and making contact with end faces of sealing members 4, 5. Gaps 10, 11 otherwise formed between different levels of the end faces of the sealing members 4, 5 and the inclined faces 9b of the lips 9, are closed with the first, second auxiliary lips 14, 15. Since the gaps 10, 11 are thus closed, foreign substances do not enter the sliding mechanism M through the gaps 10, 11.

6 Claims, 8 Drawing Sheets

(56) References Cited

U.S. PATENT DOCUMENTS

2008/0144980 A1* 6/2008 Keller et al. .................. 384/15
2009/0052815 A1* 2/2009 Kakei ............................. 384/7
2009/0245701 A1* 10/2009 Ogura et al. ................... 384/15

FOREIGN PATENT DOCUMENTS

| WO | WO 9740280 A1 | * | 10/1997 | ............ F16C 29/098 |
| WO | WO 2006079396 A2 | * | 8/2006 | ............ F16C 29/06 |
| WO | WO 2007125068 A2 | * | 11/2007 | ............ F16C 29/06 |

* cited by examiner

LINEAR MOTION GUIDE UNIT

BACKGROUND OF THE INVENTION

1. Field of the Invention

This invention relates to a linear motion guide unit suitable for use in environments where foreign substances are likely to be encountered, such as in a machine tool.

2. Description of the Related Art

FIG. 4 to FIG. 8 show an example of related-art linear motion guide units, which includes a guide rail 1 and a slider 2 straddling and sliding on the guide rail 1. The slider 2 has end caps 2a respectively attached to two opposing ends of the slider 2. Rolling elements 3 change in travel direction in the end caps 2a while traveling through the same. As illustrated in FIG. 5, the rolling elements 3 travels along a guide rail 1 provided on the slider 2 while rolling on a guiding face 1a of the guide rail 1. The rolling elements 3, raceways for guiding the rolling elements 3 and allowing the rolling elements 3 to change in travel direction, and the like form a sliding mechanism M.

The slider 2 thus structured is provided with an inner sealing member 4 which extends on an inner surface facing a flat surface 1b of the guide rail 1 in the longitudinal direction of the guide rail 1. The inner sealing member 4 has two opposing sides extending in the longitudinal direction of the guide rail 1. The two sides are folded back to form lips 4a extending inward. The lips 4a are in contact with the flat surface 1b of the guide rail 1 to prevent foreign substances adhering to the flat surface 1b from entering the sliding mechanism M.

Bottom sealing members 5 are also mounted on the underside of the slider 2 to extend in the longitudinal direction of the guide rail 1. The bottom sealing members 5 are in contact with the side faces 1c of the guide rail 1 to prevent foreign substances from entering the sliding mechanism M from the outside.

Rubber-made end seals S each including a built-in wiper seal 6 and a built-in sealing plate 7 which are shown in FIG. 6 are respectively attached to the outer end face of the end caps 2a of the slider 2. Scrapers 8 are respectively affixed to the outer end faces of the end seals S.

In the linear motion guide unit structured in this manner, during the reciprocation of the slider 1, the scrapers 8 removes foreign substances from the guide rail 1, then the wiper seals 6 and the end seals S prevent the small foreign substances slipping through the scrapers 8 from entering the inside of the slider 2.

As seen from FIG. 6, each of the end seals S structured in this manner includes a lip 9 which is in contact with the guide rail 1. The lip 9 has an inclined face 9b formed closer to the end cap 2a in order to form a contact corner 9a for making contact with the guide rail 1.

The contact corner 9a is provided in the lip 9 for the purpose of reducing the contact area of the lip 9 with the guide rail to reduce the sliding resistance of the slider 2 in order to prevent the lip 9 from being caught.

An example of such linear motion guide units is described in JP-A-2008-281091.

SUMMARY OF THE INVENTION

In a related-art linear guide motion unit as described above, gaps 10, 11 are created between the inclined face 9b of the end seal S and the inner and bottom sealing members 4 and 5 due to a level difference as shown in FIG. 7. As a result, foreign substances disadvantageously enter the inside of the sliding mechanism M through the gaps 10, 11 in the directions shown by the arrows 12, 13.

It is an object of the present invention to provide a linear motion guide unit capable of inhibiting foreign substances from entering a sliding mechanism by filling in a gap created by a level difference between a sealing member and an inclined face of a seal end as described above.

The present invention is based on a linear motion guide unit which includes a guide rail having guiding faces extending in the longitudinal direction of the guide rail, a slider straddling and sliding on the guide rail, a sliding mechanism for allowing continuous arrangement and rolling movement of rolling elements contained in the slider, a sealing member preventing foreign substances from entering the sliding mechanism, and rubber-made end seals each of which straddles the guide rail, is mounted on an end face of the slider, and has lips formed integrally with the end seal and making contact with the guide rail.

In the linear motion guide unit according to a first aspect of the present invention, auxiliary lips are formed and each of the auxiliary lips is provided in a position on an inclined face formed on each of the lips of the end seal, facing each of end faces of the sealing member, and making contact with the end face of the sealing member to close a gap that would otherwise exist due to a level difference between the end face of the sealing member and the inclined face of the lip in order to prevent foreign substances from entering the sliding mechanism.

In a second aspect of the present invention, the sealing member mounted on the slider is an inner sealing member making contact with a flat surface of the guide rail.

In a third aspect of the present invention, the sealing member mounted on the slider is a bottom sealing member making contact with a side face of the guide rail.

In a fourth aspect of the present invention, the slider is mounted with an inner sealing member and bottom sealing members. First auxiliary lips are formed on the inclined face of the lip facing an end face of the inner sealing member. Second auxiliary lips are formed on the inclined face of the lip facing an end face of each of the bottom sealing members.

In a fifth aspect of the present invention, the end seal is mounted with a wiper seal, and a scraper is placed on the outer face of the wiper seal.

ADVANTAGEOUS EFFECT OF THE INVENTION

According to the first to fifth aspects of the present invention, since the gap otherwise formed due to different levels of the sealing member and the inclined face of the end seal is closed by the auxiliary lip, it is impossible for foreign substances to pass through the gap due to the level difference, thus preventing foreign substance from entering the sliding mechanism.

DETAILED DESCRIPTION OF THE INVENTION

Figure 1:
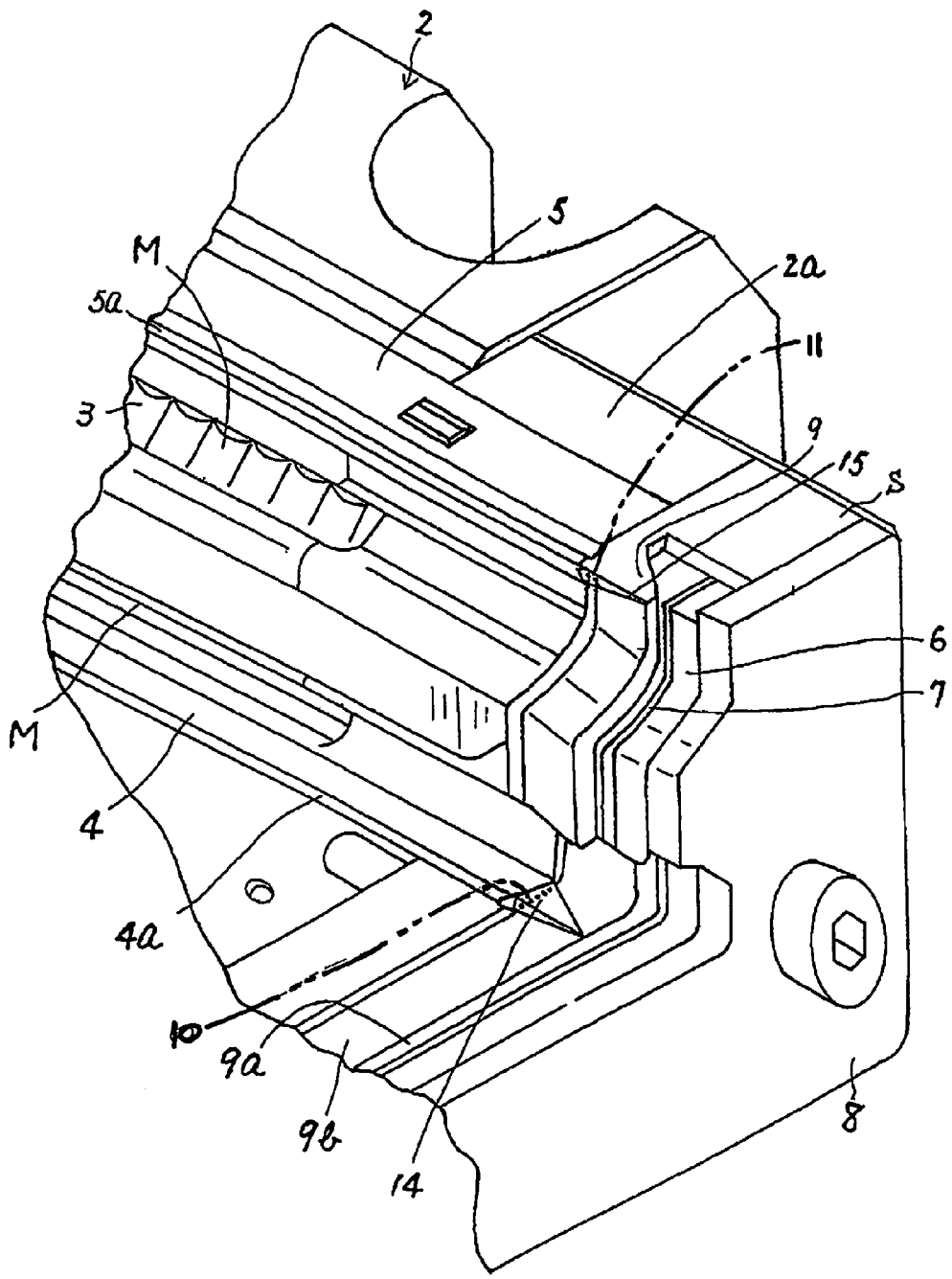
FIG. 1 is an enlarged perspective view illustrating an important part when viewed from the bottom of a slider according to the present invention.
Figure 2:
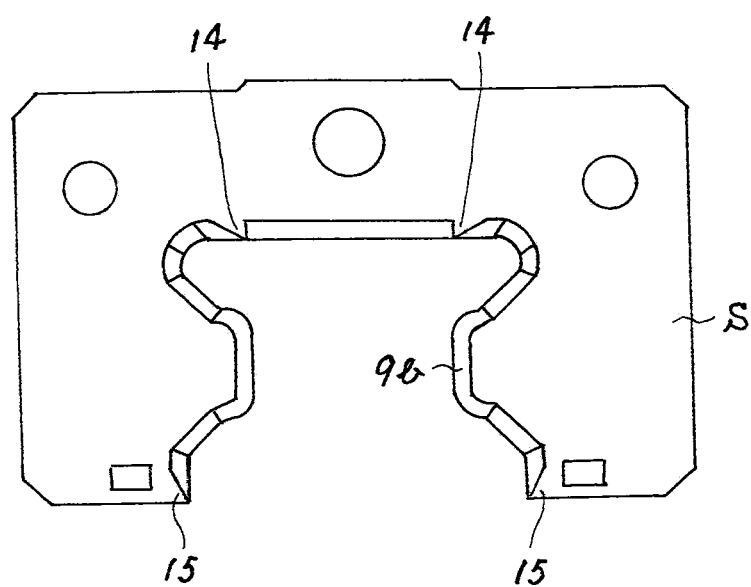
FIG. 2 is a front view of an end seal when viewed from the side face making contact with an end cap.
Figure 3:
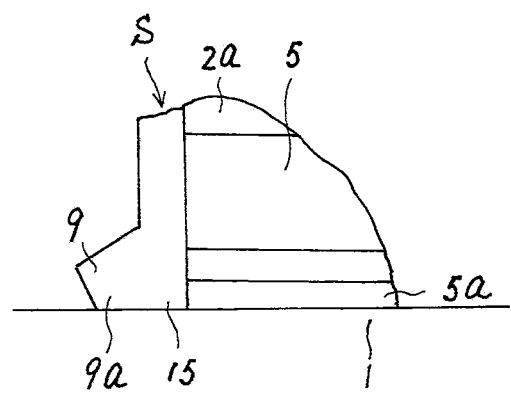
FIG. 3 is a partially enlarged view illustrating a second auxiliary lip filling a gap created by a level difference.
Figure 4:
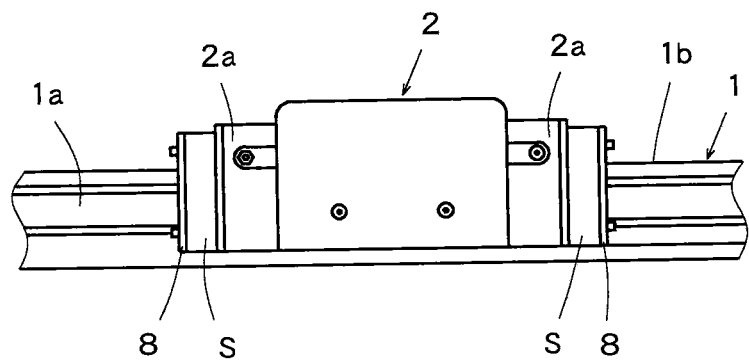
FIG. 4 is a front view illustrating a linear motion guide unit in related art.
Figure 5:
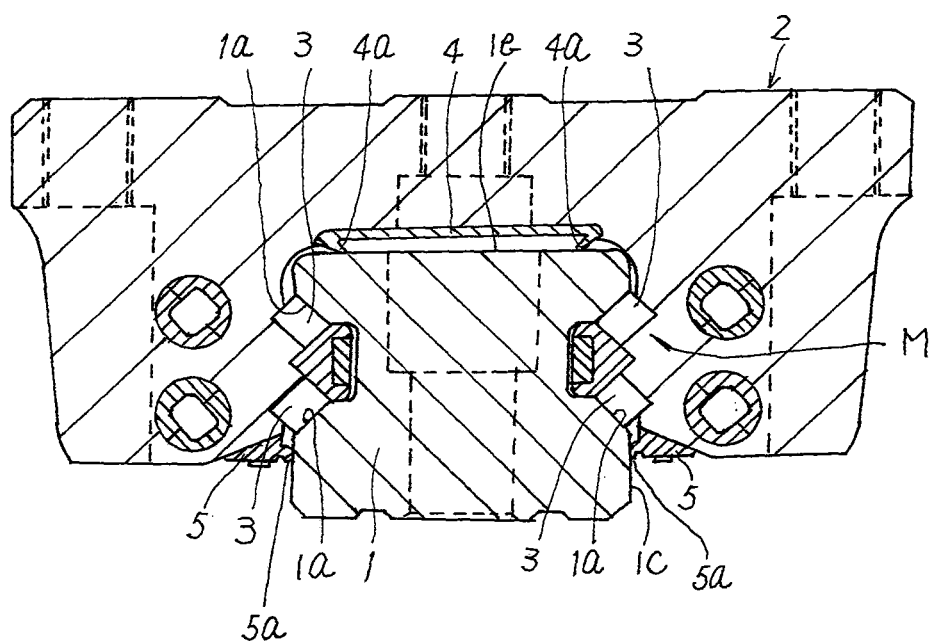
FIG. 5 is a sectional view illustrating the linear motion guide unit in related art.
Figure 6:
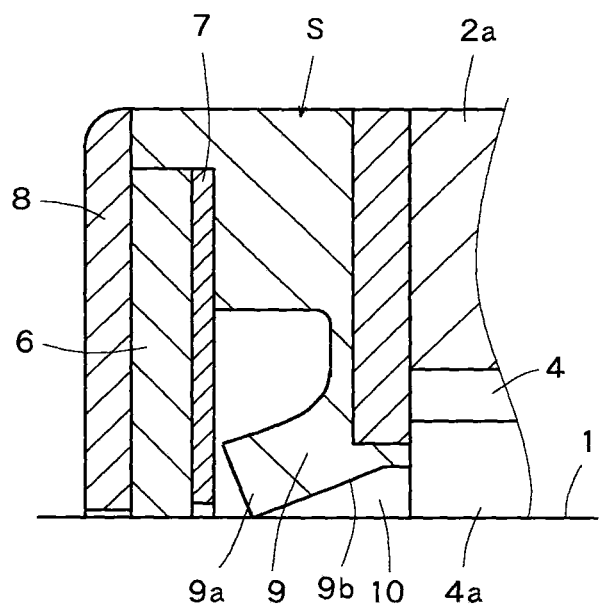
FIG. 6 is a sectional view illustrating a part of an end seal of the linear motion guide unit in related art.
Figure 7:
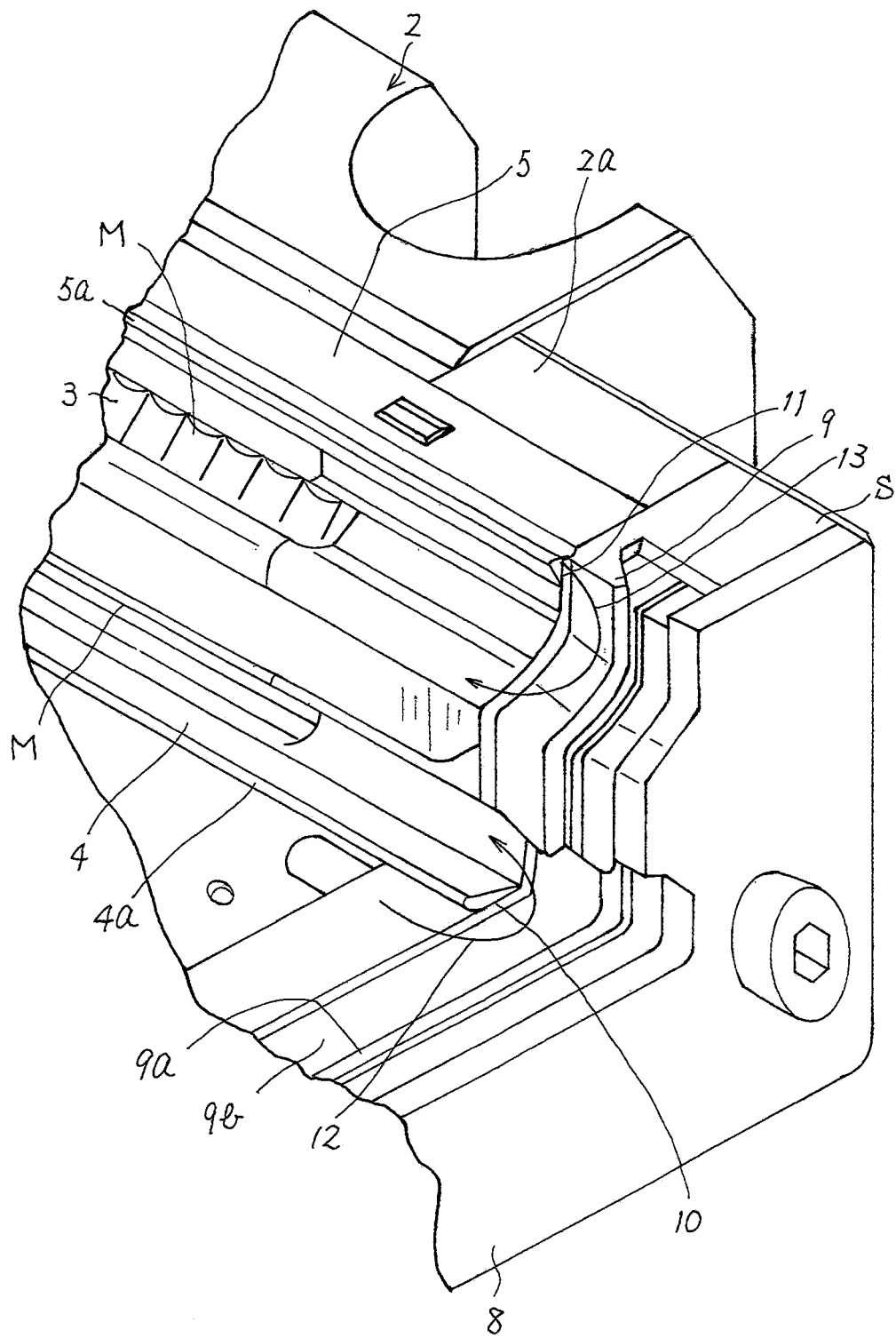
FIG. 7 is an enlarged perspective view of a slider of the linear motion guide unit in related art when viewed from the bottom of the slider.
Figure 8:
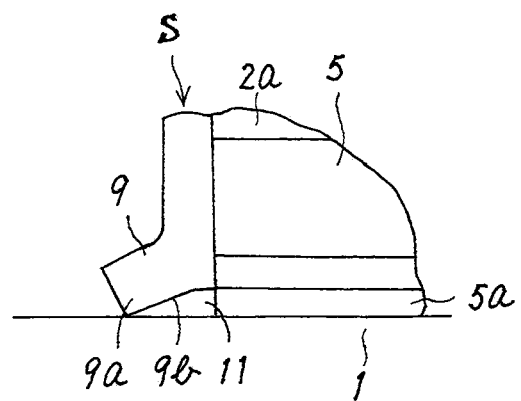
FIG. 8 is a partially enlarged view illustrating a gap formed in a portion of the linear motion guide unit in which a lip portion of the end seal and the bottom sealing member adjoin due to a level difference between the lip portion and the bottom sealing member in related art.

FIG. 1 to FIG. 3 illustrate a linear motion guide unit of an exemplary embodiment according to the present invention, the entire structure of which is the same as that of the linear motion guide unit described in related art. Specifically, the slider 2 straddles the guide rail 1, and is moved along the guiding faces 1a of the guide rail 1 by the sliding mechanism M.

The slider 2 is provided with the end caps 2a and the end seals S. Each of the end seals S includes the built-in wiper seal 6 and the built-in sealing plate 7. Then, the scraper 8 is placed outside the wiper seal 6.

The slider 2 is mounted with the inner sealing member 4 and the bottom sealing members 5 in order to prevent foreign substances adhering to the guide rail 1 from entering the sliding mechanism M.

A principal feature in the exemplary embodiment is provision of first, second auxiliary lips 14, 15 in locations corresponding to the gaps 10, 11 that would otherwise be created by a level difference in related art.

Specifically, each of the first auxiliary lips 14 comprises a protrusion formed on the inclined face 9b. The protrusion has a triangular cross-section shape extending toward the scraper 8 and the vertex of the triangular cross section protrudes toward the guide rail 1 as illustrated in FIG. 2. The first auxiliary lip 14 is in contact with a corresponding end face of the lip 4a of the inner sealing member 4 exposed from the inclined face 9b, and gradually decreases in thickness along the inclined face 9b in the direction toward the scraper 8 and also in the width direction of the slider 2. In this manner, each first auxiliary lip 14 closes a gap 10 (shown in FIG. 1 by dotted lines) which would otherwise be formed between the inner face of lip 4a of inner sealing member 4 and an inclined face 9b of end seal S (if the auxiliary lip 14 were not provided) to prevent entry of foreign substances.

Each of the second auxiliary lips 15 comprises a protrusion formed on the inclined face 9b as in the case of the first auxiliary lip 14. The protrusion has a triangular cross-section shape extending toward the scraper 8 and the vertex of the triangular cross section protrudes toward the guide rail 1 as illustrated in FIG. 2. The second auxiliary lip 15 is in contact with a corresponding end face of the lip 5a of the bottom sealing member 5 exposed from the inclined face 9b, and gradually decreases in thickness along the inclined face 9b in the direction toward the scraper 8 and also in the width direction of the slider 2. In this manner, each second auxiliary lip 15 closes a gap 11 (shown in FIG. 1 by dotted lines) which would otherwise be formed between the inner face of lip 5a of bottom sealing member 5 and an inclined face 9b of the end seal S (if the auxiliary lip 15 was not provided) to prevent entry of foreign substances.

Because of the structure designed as described above, the gaps 10, 11 created by a level difference in related art are closed with the auxiliary lips 14, 15, so that the linear motion guide unit is protected from entry of foreign substances into the sliding mechanism M. Since the gaps 10, 11 created by a level difference are filled with the first, second auxiliary lips 14, 15 in this manner, the sliding mechanism M can be protected even when the linear motion guide unit is used in significant adverse environments, the endurance of the sliding mechanism M can be improved and also the product lifetime can be extended.

INDUSTRIAL APPLICABILITY

In particular, the linear motion guide unit is suitable for use in adverse environments.

What is claimed is:

1. A linear motion guide unit, including
a guide rail having a flat surface extending in the longitudinal direction of the guide rail,
a slider straddling and sliding on the guide rail,
a sliding mechanism for allowing continuous arrangement and rolling movement of rolling elements contained in the slider,
an inner sealing member mounted on an inner surface of the slider making contact with the flat surface of the guide rail for preventing foreign substances from entering the sliding mechanism, said inner sealing member having end faces, and
rubber-made end seals each of which straddles the guide rail, is mounted on an end face of the slider, and has lips formed integrally with the end seal and making contact with the guide rail,
the linear motion guide unit, comprising
auxiliary lips each provided in positions on an inclined face formed on each of the lips of each of the end seals, facing and making contact with each of the end faces of the inner sealing member to close gaps that would otherwise be created by a level difference between the end faces of the inner sealing member and the inclined face of the lip if the auxiliary lips were not provided, in order to prevent foreign substances from entering the sliding mechanism.

2. A linear motion guide unit as recited in claim 1 wherein each auxiliary lip comprises a protrusion formed on the inclined face formed on each of the lips of each of the end seals, said auxiliary lips each having a triangular cross section with a vertex that protrudes towards the guide rail.

3. A linear motion guide unit, including
a guide rail having side faces extending in the longitudinal direction of the guide rail,
a slider straddling and sliding on the guide rail,
a sliding mechanism for allowing continuous arrangement and rolling movement of rolling elements contained in the slider,
bottom sealing members mounted on an underside of the slider making contact with the side faces of the guide rail for preventing foreign substances from entering the slider mechanism, said bottom sealing members having end faces,
rubber-made end seals each of which straddles the guide rail, is mounted on an end face of the slider, and has lips formed integrally with the end seal and making contact with the guide rail,
the linear motion guide unit, comprising
auxiliary lips each provided in a position on an inclined face formed on each of the lips of each of the end seals, facing and making contact with each of the end faces of the bottom sealing members to close gaps that would otherwise be created by a level difference between the end faces of the bottom sealing members and the inclined face of the lip if the auxiliary lips were not provided, in order to prevent foreign substances from entering the sliding mechanism.

4. A linear motion guide unit as recited in claim 3 wherein each auxiliary lip comprises a protrusion formed on the inclined face formed on each of the lips of each of the end seals, said auxiliary lips each having a triangular cross section with a vertex that protrudes towards the guide rail.

5. A linear motion guide unit, including a guide rail having a flat surface and side faces extending in the longitudinal direction of the guide rail, a slider straddling and sliding on the guide rail, a sliding mechanism for allowing continuous arrangement and rolling movement of rolling elements contained in the slider, an inner sealing member mounted on an inner surface of the slider making contact with the flat surface of the guide rail for preventing foreign substances from entering the sliding mechanism, said inner sealing member having end faces, bottom sealing members mounted on an underside of the slider making contact with the side faces of the guide rail for preventing foreign substances from entering the slider mechanism, said bottom sealing members having end faces, and rubber-made end seals each of which straddles the guide rail, is mounted on an end face of the slider, and has lips formed integrally with the end seal and making contact with the guide rail, the linear motion guide unit, comprising first auxiliary lips each provided in a position on an inclined face formed on each of the lips of each of the end seals, facing and making contact with each of the end faces of the inner sealing member to close gaps that would otherwise be created by a level difference between the end faces of the inner sealing member and the inclined face of the lip if the first auxiliary lips were not provided, in order to prevent foreign substances from entering the sliding mechanism, and second auxiliary lips each provided in a position on an inclined face formed on each of the lips of each of the end seals, facing and making contact with each of the end faces of the bottom sealing members to close gaps that would be otherwise be created by a level difference between the end faces of the bottom sealing members and the inclined face of the lip if the second auxiliary lips were not provided, in order to prevent foreign substances from entering the sliding mechanism.

6. A linear motion guide unit as recited in claim 5 wherein each of said first and second auxiliary lips comprises a protrusion formed on the inclined face formed on each of the lips of each of the end seals, said first and second auxiliary lips each having a triangular cross section with a vertex that protrudes towards the guide rail.

* * * * *